United States Patent
James

(10) Patent No.: US 8,575,251 B2
(45) Date of Patent: Nov. 5, 2013

(54) RECYCLED ELASTOMER AND METHOD

(75) Inventor: Michael S. James, Streetsboro, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 317 days.

(21) Appl. No.: 12/906,396

(22) Filed: Oct. 18, 2010

(65) Prior Publication Data

US 2011/0095106 A1 Apr. 28, 2011

Related U.S. Application Data

(60) Provisional application No. 61/254,085, filed on Oct. 22, 2009.

(51) Int. Cl.
- *C08K 5/00* (2006.01)
- *C08L 95/00* (2006.01)
- *B02C 23/06* (2006.01)
- *B04B 15/04* (2006.01)

(52) U.S. Cl.
USPC .................................. 524/236; 241/16; 524/61

(58) Field of Classification Search
USPC .................................... 524/236, 61
See application file for complete search history.

(56) References Cited

U.S. PATENT DOCUMENTS

| | | |
|---|---|---|
| 4,112,176 A | 9/1978 | Bailey |
| 4,278,481 A | 7/1981 | Osment |
| 4,310,446 A | 1/1982 | Gaus et al. |
| 4,452,920 A | 6/1984 | Joubert |
| 4,485,201 A | 11/1984 | Davis |
| 4,493,480 A | 1/1985 | Nichol |
| 4,506,982 A | 3/1985 | Smithers et al. |
| 4,535,941 A | 8/1985 | Brubaker et al. |
| 4,546,132 A | 10/1985 | Miettunen |
| 4,588,477 A | 5/1986 | Habib |
| 4,651,354 A | 3/1987 | Petrey |
| 5,019,431 A | 5/1991 | Osment et al. |
| 5,059,636 A | 10/1991 | Grenga |
| 5,234,988 A | 8/1993 | Brooks et al. |
| 5,244,304 A | 9/1993 | Weill et al. |
| 5,371,136 A | 12/1994 | Brooks et al. |
| 5,478,147 A | 12/1995 | O'Brien et al. |
| 5,525,416 A | 6/1996 | Katz et al. |
| 5,683,498 A | 11/1997 | Hesp |
| 5,712,314 A | 1/1998 | Surles et al. |
| 5,741,112 A | 4/1998 | Lakin et al. |
| 5,763,335 A | 6/1998 | Hermann |
| 5,800,754 A | 9/1998 | Woods |
| 5,856,376 A | 1/1999 | Wong |
| 5,889,119 A | 3/1999 | Coran et al. |
| 6,025,287 A | 2/2000 | Hermann |
| 6,354,523 B1 | 3/2002 | Liu |
| 6,384,145 B1 * | 5/2002 | Mertzel et al. ............... 525/232 |
| 6,425,540 B1 | 7/2002 | Morris et al. |
| 6,569,977 B1 | 5/2003 | Liu |
| 6,639,003 B2 * | 10/2003 | Borsinger et al. ........... 524/487 |
| 6,821,623 B2 | 11/2004 | Kvesic |
| 6,896,964 B2 | 5/2005 | Kvesic |
| 6,918,979 B2 | 7/2005 | Shaffer |
| 6,976,646 B2 | 12/2005 | Morris et al. |
| 6,988,524 B2 | 1/2006 | Shaffer |
| 7,048,473 B2 | 5/2006 | Takemiya |
| 7,189,445 B2 | 3/2007 | Knox |
| 2005/0143518 A1 * | 6/2005 | Eichenauer .................... 525/67 |

OTHER PUBLICATIONS

Hofmann, Werner, Rubber Technology Handbook, Chapter 4.3 Aging and Aging Protectors (Antioxidants), pp. 264-277 (1989).

* cited by examiner

*Primary Examiner* — Ling Choi
*Assistant Examiner* — Ronald Grinsted
(74) *Attorney, Agent, or Firm* — Shaun J. Fox; Nathan T. Lewis

(57) ABSTRACT

The present disclosure provides a method comprising reducing the size of elastomeric particles in the presence of a liquid, wherein said liquid comprises an antidegradant and optionally a surfactant. Further provided is a method comprising bringing elastomeric particles into contact with a liquid, wherein said liquid comprises an antidegradant and, optionally, a surfactant. Also provided is an elastomeric particle that is created from an original elastomeric piece, where said elastomeric particle has an antidegradant concentration greater than that of the original elastomeric piece. Further provided is a rubber composition comprising the elastomeric particle. Additionally, the disclosure provides a tire containing a rubber composition that comprises the elastomeric particle.

12 Claims, No Drawings

RECYCLED ELASTOMER AND METHOD

The present application claims the benefit of U.S. provisional patent application Ser. No. 61/254,085, filed Oct. 22, 2009, and entitled "Recycled Elastomer and Method," the disclosure of which is incorporated herein by reference.

FIELD OF DISCLOSURE

This disclosure relates to the recycling of elastomers. More particularly, the disclosure relates to an elastomeric particle that is created from an original elastomeric piece, where said elastomeric particle has an antidegradant concentration greater than that of the original elastomeric piece. The disclosure also relates to methods for producing the new elastomeric particles.

BACKGROUND

It may be desirable to utilize recycled elastomer in new elastomeric compositions. When recycling elastomers, it is generally known to decrease the size of the elastomeric material to be recycled to very small size particles. Such particles have been discovered to be mechanically easier to mix into new elastomeric compositions and provide compositions having improved physical properties over compositions comprising particles of larger size. A wide range of elastomeric products may be recycled. Such materials include natural or synthetic rubber scrap and automotive tire scrap.

Various methods have been suggested in the prior art for reducing the size of elastomeric particles as part of a recycling process, including cryogenic cracking of the particles and various grinding or chopping methods.

A particularly advantageous method for reducing the size of elastomeric particles is a wet-grinding process, where a slurry of liquid, usually water, containing elastomeric material is passed through grinding stones. The liquid helps keep the elastomeric material cool during the grinding process and helps prevent the material from thermally degrading. Cryogenic cracking can also control the amount of thermal degradation in the elastomeric material. However this process is typically more costly than the wet-grinding method.

Even though methods exist for reducing the size of elastomeric particles, the use of recycled vulcanized elastomeric particles in products requiring resistance to oxidation and ozone, e.g., tire sidewalls, has been limited due to the lower oxidation and ozone resistance in the products produced using the recycled vulcanized elastomeric particles. It is believed that oxidation and ozone resistance are lowered since the elastomeric material to be recycled has already expended most of the antidegradant it contained to resist oxidation and ozonation. Thus, the recycled elastomeric particles provide locations for oxidation and ozonation to occur. Moreover, simply adding more antidegradant to a new elastomeric composition containing recycled elastomeric particles does not adequately improve the oxidation and ozone resistance.

Accordingly, an elastomeric particle has been discovered that provides improved oxidation and ozone resistance over the elastomeric particles of the prior art. Methods for producing the particles have also been discovered.

As used herein, the term "antidegradant" includes both antioxidants and antiozonants.

As used herein, the terms "particle(s)" and "piece(s)" are used interchangeably, and represent portions or fragments of various sizes.

BRIEF SUMMARY OF THE DISCLOSURE

The present disclosure provides a method comprising reducing the size of elastomeric particles in the presence of a liquid, wherein said liquid Comprises an antidegradant and, optionally, a surfactant.

Further provided is a method comprising bringing elastomeric particles into contact with a liquid, wherein said liquid comprises an antidegradant and, optionally, a surfactant.

Also provided is an elastomeric particle that has an antidegradant concentration greater than that of the original elastomeric piece. The term "original elastomeric piece" is meant herein to represent the elastomeric piece (of various sizes) that is to be brought into contact with the liquid comprising an antidegradant and, optionally, a surfactant. The antidegradant concentration of the original elastomeric piece is meant herein to refer to the antidegradant concentration at the time just before the original elastomeric piece is brought into contact with the liquid comprising an antidegradant and, optionally, a surfactant.

Further provided is a rubber composition comprising an elastomeric particle, wherein said elastomeric particle is created from an original elastomeric piece, and said elastomeric particle has an antidegradant concentration greater than that of the original elastomeric piece.

Additionally, the disclosure provides a tire containing a rubber composition that comprises an elastomeric particle, wherein said elastomeric particle is created from an original elastomeric piece, and said elastomeric particle has an antidegradant concentration greater than that of the original elastomeric piece.

DETAILED DESCRIPTION

Methods of reducing the size of elastomeric particles in the presence of a liquid are well known. For example, U.S. Pat. Nos. 4,535,941, 5,238,194, and 5,411,215, all of which are hereby incorporated by reference in their entirety, disclose methods of reducing the size of elastomeric particles by passing a slurry of water and elastomeric particles through a grinding zone. Typically, the elastomeric particles are vulcanized rubber that is to be recycled for reuse in new elastomeric compositions. In one embodiment, disclosed in U.S. Pat. No. 5,238,194, a grinding apparatus includes a horizontal grinding machine providing a fixed stator and a rotating rotor, on which disc-shaped grinding stones having hollow centers can be mounted. The grinding stones provide flat, opposing abrasive surfaces. The abrasive surfaces provide periodically spaced openings in the annulus for introducing the elastomers to be ground between the closed, cooperating abrading surfaces. The elastomers to be ground may be introduced between the abrading surfaces as a slurry of water and elastomeric particles.

In another embodiment, disclosed in U.S. Pat. No. 4,535,941, a slurry of elastomeric particles and fluid, such as water, is received in a receiving region which is disposed between a rotor and stator. The rotor and stator have peripheral abrasive surfaces surrounding the receiving region for defining a grinding zone therebetween. The elastomeric particles are urged radially outward into the grinding zone between the rotor and stator peripheral abrasive surfaces. The rotor peripheral abrasive surface is rotated relative to the stator peripheral abrasive surface and the rotor and stator are forced together toward intimate physical contact with the elastomeric particles therebetween. Under the forces urging the rotor and stator peripheral surfaces together and the relative rotational movement, the elastomeric particles are ground to smaller particles.

The method disclosed herein contemplates that the size of elastomeric particles may be reduced by mechanical means, including, but not limited to, grinding, chopping, cryogenic cracking, and the like.

It has been discovered that when reducing the size of elastomeric particles having a concentration of antidegradant(s) in the presence of a liquid, the addition of antidegradant(s) to the liquid yields elastomeric particles having an antidegradant concentration greater than that of the original elastomeric particles. Without intending to be bound by theory, it is believed that this occurs because the antidegradant(s) present in the liquid can penetrate the elastomeric particles and/or deposit on their surface. This is advantageous because, as mentioned earlier, mixing additional antidegradant into a rubber composition containing recycled elastomeric particles generally does not sufficiently improve the oxidation and ozone resistance of the rubber composition. Without intending to the bound by theory, it is believed that oxidation and ozone resistance are not improved by simply adding additional antidegradant to the rubber composition because the antidegradant does not penetrate or deposit on the recycled elastomeric particles in a sufficient amount due to their limited exposure to the antidegradant while in the rubber composition. Thus, it is desirable to add the antidegradant(s) directly to the recycled elastomeric particles.

Any antidegradant that is known to be useful in elastomeric compositions can be added to the liquid. Such antidegradants are well known to persons skilled in the art and include, but are not limited to, amines, phenolics, quinolines and mixtures thereof.

Suitable amine antidegradants include, but are not limited to, N-Isopropyl-N'-phenyl-p-phenylenediamine; N-(1-methylhexyl)-N'-phenyl-p-phenylenediamine ("6PPD"); N,N'-Bis(1,4-dimethylpentyl)-p-phenylenediamine ("7PPD"); N,N'-Bis-(1-ethyl-3-methylpentyl)-p-phenylenediamine; N,N'-Diphenyl-p-phenylenediamine; N,N'-Ditolyl-p-phenylenediamine; N,N'-Di-β-naphthyl-p-phenylenediamine; p,p'-dioctyldiphenylamine; and mixtures thereof.

Suitable phenolic antidegradants include, but are not limited to, alkylated-arylated bisphenolic phosphite; polybutylated bisphenol; tris-(3,5-di-t-butyl-4-hydroxybenzyl)isocyanurate; 2,2'-methylene-bis-(4-methyl-6-tert-butyl-phenol); 2,2'-methylene-bis-(4-methyl-6-cyclohexylphenol); 2,2'-Isobutylidene-bis-(4-methyl-6-tert-butylphenol); 2,6-Di-tert-butyl-p-cresol; alkylated phenol; styreneated phenol; and mixtures thereof.

Suitable quinoline antidegradants include, but are not limited to, 6-ethoxy-2,2,4-trimethyl-1,2,dihydroquinoline; polymerized 2,2,4-trimethyl-1,2-dihydroquinoline; and mixtures thereof.

In one embodiment, the antidegradant is N-(1-methylhexyl)-N'-phenyl-p-phenylenediamine ("6PPD").

The antidegradant(s) can be added in any desired amount. Preferably, the antidegradant(s) is present in an amount of about 0.05 to about 10 wt. percent, more preferably from about 1 to about 7 wt. percent, and even more preferably from about 2 to about 5 wt. percent, based on the weight of the liquid.

If the antidegradant(s) is immiscible in the liquid, e.g., water, it may be desirable to add one or more surfactants to the liquid to lower the surface tension between the liquid and antidegradant. Immiscible is meant to mean that the liquid and antidegradant separate from each other after mixing so as to form separate layers. Any surfactant capable of improving the miscibility of the antidegradant in the liquid may be added. The purpose of improving the miscibility of the antidegradant in the liquid is to form a solution or stable suspension where the antidegradant and the liquid are sufficiently homogenous, such that the elastomeric particles are in sufficient contact with the antidegradant. Such surfactants include, but are not limited to, anionic, cationic, non-ionic, and zwitterionic (those having a dual charge) surfactants. The type of surfactant may depend upon the type of antidegradant chosen. This is within the knowledge of those skilled in the art.

Suitable anionic surfactants include, but are not limited to, sodium dodecyl sulfate, ammonium lauryl sulfate, sodium laureth sulfate, alkyl benzene sulfonate, soaps, fatty acid salts, and mixtures thereof.

Suitable cationic surfactants include, but are not limited to, cetyl trimethylammonium bromide (CTAB), cetylpyridinium chloride (CPC), polyethoxylated tallow amine (POEA), benzalkonium chloride (BAC), benzethonium chloride (BZT), and mixtures thereof.

Suitable nonionic surfactants include, but are not limited to, alkylphenol ethoxylates (e.g., poly(oxy-1,2-ethanediyl), alpha-nonylphenyl-omega-hydroxy-), alkyl poly(ethylene oxide), copolymers of poly(ethylene oxide) and poly(propylene oxide), alkyl polyglycosides, sorbitan esters, fatty alcohols, and mixtures thereof.

Suitable zwitterionic surfactants include, but are not limited to, dodecyl betaine, dodecyl dimethylamine oxide, cocamidopropyl betaine, coco ampho glycinate, and mixtures thereof.

In one embodiment, the surfactant is polyoxyethylene nonylphenol.

The surfactant(s), if used, can be added in any desired amount. Typically the amount of surfactant used is one that will prevent the antidegradant from separating from the liquid after being mixed. Preferably, if used, the surfactant is present in an amount of about 0.05 to about 10 wt. percent, more preferably from about 1 to about 7 wt. percent, and even more preferably from about 2 to about 5 wt. percent, based on the weight of the liquid.

The antidegradant(s) and, if used, surfactant(s) are preferably combined with the liquid used in the process for reducing the size of the elastomeric particles. However, the elastomeric particles may be brought into contact with a liquid comprising the antidegradant(s) and, optionally, surfactant(s) at any time. For example, the elastomeric particles may be sprayed or soaked with a liquid comprising antidegradant(s) and, optionally, surfactant(s) before or after being reduced in size. The elastomeric particles can be in contact with a liquid comprising antidegradant(s) and, optionally, surfactant(s) for any desired amount of time. Preferably, the elastomeric particles will be in contact with the liquid mixture for about 1 second to about 24 hours, more preferably from about 0.1 hours to about 12 hours, and even more preferably from about 0.25 hours to about 6 hours. Preferably, the elastomeric particles are agitated while in contact with the liquid comprising the antidegradant(s) and, optionally, surfactant(s).

The liquid(s) containing the antidegradant(s) may be any liquid that is capable of being mixed with an antidegradant. Suitable liquids include, but are not limited to, water, solvents, oils, and mixtures thereof. Preferably, the liquid is water if the antidegradant(s) and, if used, surfactant(s) are combined with the liquid used in the process for reducing the size of the elastomeric particles. However, if the elastomeric particles are brought into contact with a liquid comprising the antidegradant(s) and, optionally, surfactant(s) at any time other than when the elastomeric particles are being reduced in le;.5qsize, the liquid may be preferably be a solvent, oil, or mixtures thereof. Suitable solvents include, but are not limited to, acetone, ethanol, toluene, naphtha, pentane, hexane, heptane, octane, nonane, decane, cyclopentane, cyclohexane, cycloheptane, cyclooctane, and the like, and mixtures thereof. Suitable oils include, but are not limited to, aromatic, naphthenic, paraffinic, and mixtures thereof.

The antidegradant(s) and, if used, surfactant(s) can be mixed with the liquid at any desirable temperature. If the liquid is water, the temperature will preferably be above the melting temperature of the antidegradant and below the boiling point of the liquid. If the liquid comprises a solvent or an oil, the temperature may be any temperature that allows the antidegradant to dissolve. In one embodiment, the temperature of the liquid is about 10° C. to about 100° C., and more preferably from about 20° C. to about 80° C., and even more preferably from about 40° C. to about 70° C.

The elastomeric particles are dried after they are removed from the liquid. Drying may be conducted by simply allowing the elastomeric particles to be exposed to air, or by drying them in an oven. The elastomeric particles can be dried to remove the desired amount of liquid. Preferably, after drying, the liquid content in the elastomeric particles will be less than 5 wt %, more preferably less than 2 wt %, and even more preferably less than 1 wt %, based on the weight of the dried elastomeric particle.

Any elastomeric particles may be used in the present disclosure. In one embodiment, the elastomeric particles are vulcanized.

The elastomeric particles produced by the methods of the disclosure may have an antidegradant concentration greater than that of the original elastomeric piece.

The elastomeric particles may be added to any rubber composition in any desired amount, typically from about 1 to about 50 parts by weight per 100 parts by weight of the elastomer component ("phr"), or from about 5 to about 20 phr, or from about 5 to about 10 phr. The rubber composition may be a vulcanizable rubber composition suitable as a tire component. Suitable tire components include, but are not limited to, tread, subtread, and sidewall.

The elastomeric particles prepared according to this disclosure may be blended with elastomers, including, but are not limited to, natural rubber, synthetic polyisoprene rubber, styrene-butadiene copolymer rubber (SBR), polybutadiene, butyl rubber, poly(chloroprene), ethylene-propylene copolymer rubber, ethylene-diene terpolymer rubber (EPDM), acrylonitrile-butadiene copolymer rubber (NBR), silicone rubber, fluoroelastomers, ethylene-acrylic copolymer rubber, ethylene vinyl acetate copolymer (EVA), epichlorohydrin rubbers, chlorinated polyethylene rubbers, chlorosulfonated polyethylene rubbers, hydrogenated nitrile rubbers, tetrafluoroethylene-propylene copolymer rubber, and mixtures thereof, to form vulcanizable rubber composition.

Typically, these vulcanizable rubber compositions will include reinforcing fillers, such as carbon black and/or silica, and at least one vulcanizing agent. These compositions typically also include other compounding additives such as accelerators, oils, waxes, scorch inhibiting agents, and processing aids. These ingredients are known in the art, and May be added in appropriate amounts based on the desired physical and mechanical properties of the vulcanizable rubber composition.

The vulcanizable rubber composition may be compounded or blended by using mixing equipment and procedures conventionally employed in the art, such as mixing the ingredients in a Banbury mixer. Preferably, an initial masterbatch is prepared that includes the rubber component and the reinforcing fillers, as well as other optional additives such as processing oil and antioxidants. Once this initial masterbatch is prepared, the vulcanizing agents are blended into the composition. This vulcanizable composition of matter can then be processed according to ordinary manufacturing techniques.

The present disclosure will be described in more detail with reference to the following examples. The following examples are presented for purposes of illustration only and are not to be construed in a limiting sense.

EXAMPLES

Mixing Liquid and Antidegradant

Example 1

4.99 grams of N-(1-methylhexyl)-N'-phenyl-p-phenylenediamine ("6PPD") were added to 250 ml of water. The temperature of the water was 70° C. 5 ml of polyoxyethylene nonylphenol were then added to the mixture. The 6PPD remained in a fine suspension in the water.

Example 2

4.99 grams of 6PPD were added to 250 ml of water. The temperature of the water was 70° C. 10 ml of polyoxyethylene nonylphenol were then added to the mixture. The 6PPD precipitated from the water.

Example 3

1.14 grams of 6PPD were added to 250 ml of water. The temperature of the water was 60° C. 2 ml of polyoxyethylene nonylphenol were then added to the mixture. The 6PPD remained in a fine suspension in the water.

Example 4

1.14 grams of 6PPD were added to 250 ml of water. The temperature of the water was 70° C. 5 ml of polyoxyethylene nonylphenol were then added to the mixture. The 6PPD precipitated from the water.

Example 5

0.10 grams of 6PPD were added to 250 ml of water. The temperature of the water was 70° C. 1 ml of polyoxyethylene nonylphenol was then added to the mixture. The 6PPD remained in a fine suspension in the water.

Example 6

0.10 grams of 6PPD were added to 250 ml of water. The temperature of the water was 70° C. 5 ml of polyoxyethylene nonylphenol were then added to the mixture. The 6PPD remained in a fine suspension in the water.

Examples 7-12

Six rubber compositions according to the formulations in Table 1 were prepared using a Banbury mixer. All amounts shown are in phr. Examples 7 and 8, which are comparative examples, contain no ground rubber. Examples 9 and 10, which are also comparative examples, contain 80 mesh ground rubber that has not been subjected to a liquid comprising an antidegradant. Examples 11 and 12 contain 80 mesh ground rubber that was treated as follows: 1000 grams of 80 mesh ground rubber was mixed for 15 minutes with 1500 milliliters of water containing 2 wt % 6PPD and 2 wt % poly(oxy-1,2-ethanediyl), alpha-(4-nonylphenyl)-omega-hydroxy-surfactant at 75±1-5° C. The mixture formed a slurry, which was then spread over a large area and dried at room temperature for 4 days.

TABLE 1

|  | Example 7 | Example 8 | Example 9 | Example 10 | Example 11 | Example 12 |
|---|---|---|---|---|---|---|
| Masterbatch Mixing Stage | | | | | | |
| Polybutadiene Rubber | 65 | 65 | 65 | 65 | 65 | 65 |
| Natural Rubber | 35 | 35 | 35 | 35 | 35 | 35 |
| Carbon Black | 60 | 60 | 60 | 60 | 60 | 60 |
| Untreated 80 Mesh Ground Rubber | 0 | 0 | 10 | 10 | 0 | 0 |
| Treated 80 Mesh Ground Rubber | 0 | 0 | 0 | 0 | 10 | 10 |
| Softener | 17.5 | 17.5 | 17.5 | 17.5 | 17.5 | 17.5 |
| Antidegradants | 6.5 | 6.5 | 6.5 | 6.5 | 6.5 | 6.5 |
| Zinc Oxide | 2.5 | 2.5 | 2.5 | 2.5 | 2.5 | 2.5 |
| Stearic Acid | 1.5 | 1.5 | 1.5 | 1.5 | 1.5 | 1.5 |
| Final Mixing Stage | | | | | | |
| Sulfur | 2.1 | 2.1 | 2.1 | 2.1 | 2.1 | 2.1 |
| Accelerator | 0.8 | 0.8 | 0.8 | 0.8 | 0.8 | 0.8 |

The rubber compositions were vulcanized for 15 minutes at 171° C. and subjected to testing for tensile strength and ozone crack resistance. Tensile mechanical properties were measured by using the procedure described in ASTM-D 412 at 72° F. The tensile test specimens had dumbbell shapes with a thickness of 1.9 mm. A specific gauge length of 25.4 mm was used for the tensile test.

Ozone crack resistance testing was done by a method similar to ASTM D-1149-07, procedure A1. The samples were subjected to 50 parts per hundred million (pphm) of ozone for various amounts of time. The samples experienced periods of constant strain, and other periods of flexing from strain to no strain. At the conclusion of the desired test time, the samples are removed from the chamber and are visually analyzed to determine the amount of cracks.

The results of the testing are shown in Table 2.

TABLE 2

|  | Example 7 | Example 8 | Example 9 | Example 10 | Example 11 | Example 12 |
|---|---|---|---|---|---|---|
| Tensile Mechanical Properties | | | | | | |
| Stress at 300% Elongation (Mpa) | 8.2 | 8.7 | 7.9 | 7.8 | 8.0 | 8.1 |
| Tensile at Break (Mpa) | 13.1 | 14.4 | 12.7 | 12.8 | 12.1 | 12.4 |
| Strain at Break (%) | 456 | 481 | 457 | 470 | 431 | 444 |
| Ozone Crack Resistance (80° F.) | | | | | | |
| 4 hour (% cracks) | 5 | 3 | 8 | 2 | 2 | 1 |
| 8 hour (% cracks) | 4 | 2 | 13 | 14 | 8 | 2 |
| 12 hour (% cracks) | 9 | 9 | 21 | 12 | 23 | 20 |
| 16 hour (% cracks) | 9 | 18 | 23 | 24 | 13 | 26 |
| 20 hour (% cracks) | 29 | 27 | 29 | 19 | 22 | 15 |
| 24 hour (% cracks) | 12 | 27 | 25 | 26 | 22 | 20 |
| Average | 12 | 14 | 20 | 16 | 15 | 14 |
| Ozone Crack Resistance (30° F.) | | | | | | |
| 4 hour (% cracks) | 11 | 31 | 18 | 30 | 18 | 12 |
| 8 hour (% cracks) | 20 | 18 | 29 | 35 | 17 | 18 |
| 12 hour (% cracks) | 22 | 37 | 35 | 38 | 22 | 35 |
| 16 hour (% cracks) | 36 | 29 | 35 | 34 | 29 | 28 |
| 20 hour (% cracks) | 36 | 34 | 36 | 32 | 33 | 33 |
| 24 hour (% cracks) | 36 | 37 | 35 | 36 | 34 | 35 |
| Average | 27 | 31 | 31 | 34 | 26 | 27 |

Since Examples 7 and 8 are the same composition, the results for each test are averaged below in Table 3. The same is done for Examples 9 and 10, as well as Examples 11 and 12.

TABLE 3

|  | Average of Examples 7 and 8 (No Ground Rubber) | Average of Examples 9 and 10 (Untreated Ground Rubber) | Average of Examples 11 and 12 (Treated Ground Rubber) |
|---|---|---|---|
| Tensile Mechanical Properties |  |  |  |
| Stress at 300% Elongation (Mpa) | 8.4 | 7.9 | 8.0 |
| Tensile at Break (Mpa) | 13.7 | 12.7 | 12.3 |
| Strain at Break (%) | 468 | 463 | 438 |
| Ozone Crack Resistance (80° F.) |  |  |  |
| 4 hour (% cracks) | 4 | 5 | 2 |
| 8 hour (% cracks) | 3 | 13 | 5 |
| 12 hour (% cracks) | 9 | 16 | 21 |
| 16 hour (% cracks) | 13 | 23 | 20 |
| 20 hour (% cracks) | 28 | 24 | 18 |
| 24 hour (% cracks) | 20 | 25 | 21 |
| Average | 13 | 18 | 15 |
| Ozone Crack Resistance (30° F.) |  |  |  |
| 4 hour (% cracks) | 21 | 24 | 15 |
| 8 hour (% cracks) | 19 | 32 | 17 |
| 12 hour (% cracks) | 29 | 36 | 28 |
| 16 hour (% cracks) | 32 | 35 | 28 |
| 20 hour (% cracks) | 35 | 34 | 33 |
| 24 hour (% cracks) | 37 | 36 | 34 |
| Average | 29 | 33 | 26 |

As can be seen in Table 3, on average, Examples 11 and 12 have improved resistance to ozone cracking versus Examples 9 and 10, and have comparable ozone crack resistance to Examples 7 and 8, which contain no recycled elastomeric particles.

The description has been provided with exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

What is claimed is:

1. A method comprising:
bringing elastomeric particles into contact with a liquid, wherein said liquid comprises an antidegradant and, optionally, a surfactant, the elastomeric particles are vulcanized elastomeric particles, and the bringing of the elastomeric particles into contract with said liquid is performed during a grinding process to facilitate reducing the size of the elastomeric particles.

2. The method of claim 1, wherein said liquid comprises water.

3. The method of claim 1, wherein said antidegradant is selected from the group consisting of amines, phenolics, quinolines and mixtures thereof.

4. The method of claim 1, wherein said surfactant is selected from the group consisting of nonionic, anionic, cat-ionic and zwitterionic surfactants, and mixtures thereof.

5. The method of claim 4, wherein said nonionic surfactant is selected from the group consisting of alkylphenol ethoxylates; alkyl poly(ethylene oxide); copolymers of poly(ethylene oxide) and polypropylene oxide); alkyl polyglycosides; sorbitan esters; fatty alcohols; and mixtures thereof.

6. The method of claim 5, wherein said alkyl poly(ethylene oxide) is selected from the group consisting of octyl phenol ethoxylate, polyoxyethylenenonylphenol, and mixtures thereof.

7. The method of claim 1, wherein said antidegradant comprises N-(1-methylhexyl)-N'-phenyl-p-phenylenediamine and said surfactant comprises poly(oxy-1,2-ethanediyl), alpha-(4-nonylphenyl)-omega-hydroxy-.

8. The method of claim 1, wherein said antidegradant is present in an amount of about 0.05 to about 10 wt. %, based on the weight of the liquid.

9. The method of claim 1, wherein said surfactant is present in an amount of about 0.05 to about 10 wt. %, based on the weight of the liquid.

10. The method of claim 9, wherein said antidegradant comprises N-(1-methylhexyl)-N'-phenyl-p-phenylenediamine and said surfactant comprises poly(oxy-1,2-ethanediyl), alpha-(4-nonylphenyl)-omega-hydroxy-.

11. The method of claim 1, wherein the bringing of the elastomeric particles into contact with the liquid increases a concentration of antidegradant in the elastomeric particles.

12. The method of claim 1, wherein a temperature of the liquid is about 10° C. to 100° C.

* * * * *

UNITED STATES PATENT AND TRADEMARK OFFICE
CERTIFICATE OF CORRECTION

PATENT NO.         : 8,575,251 B2
APPLICATION NO.    : 12/906396
DATED              : November 5, 2013
INVENTOR(S)        : Michael S. James Page 1 of 1

It is certified that error appears in the above-identified patent and that said Letters Patent is hereby corrected as shown below:

In the Claims

In column 10, line 23, delete "polyoxyethylenenonylphenol," and insert -- polyoxyethylene nonylphenol, --.

Signed and Sealed this
Ninth Day of June, 2015

Michelle K. Lee
*Director of the United States Patent and Trademark Office*